H. G. HAASE.
MILLING ATTACHMENT FOR METAL LATHES.
APPLICATION FILED OCT. 7, 1911.
1,038,571.
Patented Sept. 17, 1912.
2 SHEETS—SHEET 1.
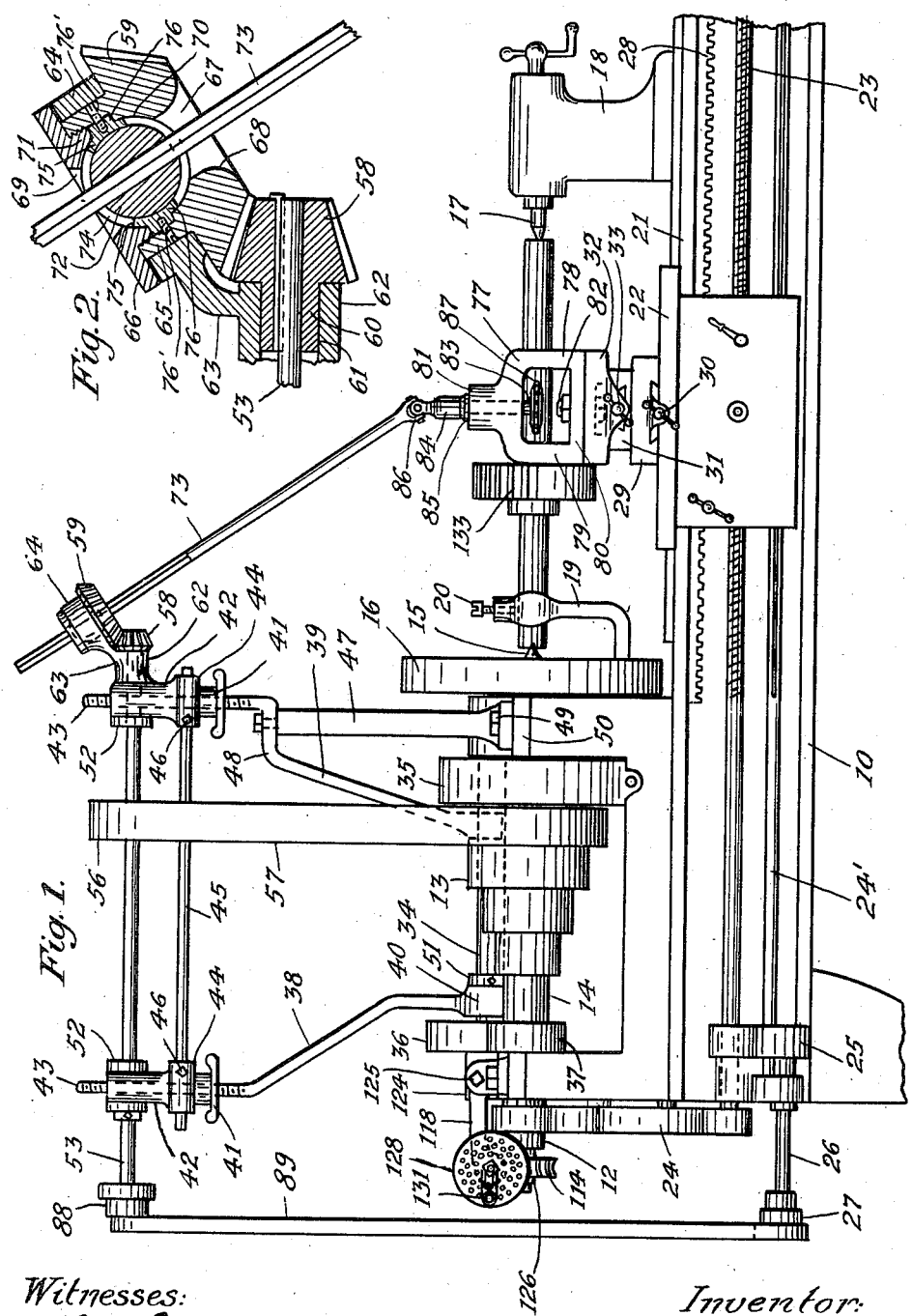
Witnesses:
Theo Laggard.
G. E. Hagen.
Inventor:
Herman G. Haase.
By F. A. Whiteley
his Attorney.

H. G. HAASE.
MILLING ATTACHMENT FOR METAL LATHES.
APPLICATION FILED OCT. 7, 1911.
1,038,571.
Patented Sept. 17, 1912.
2 SHEETS—SHEET 2.
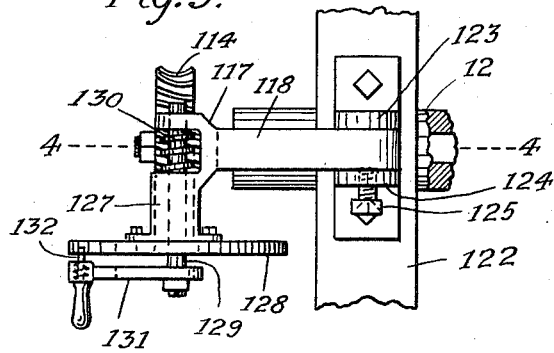
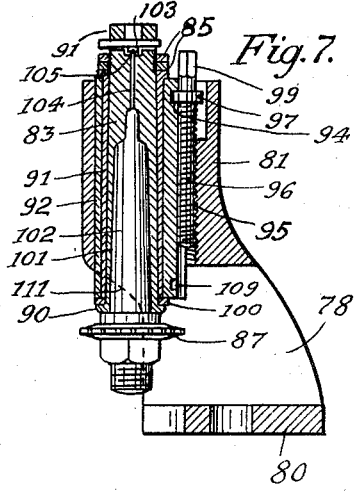
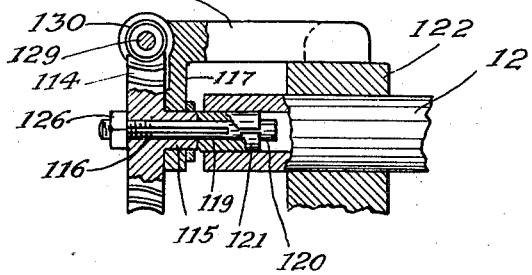
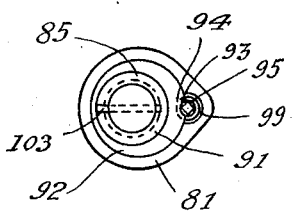
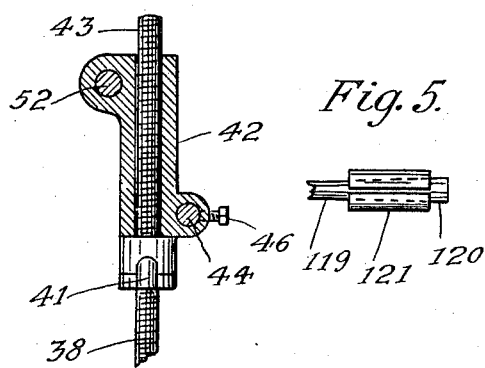
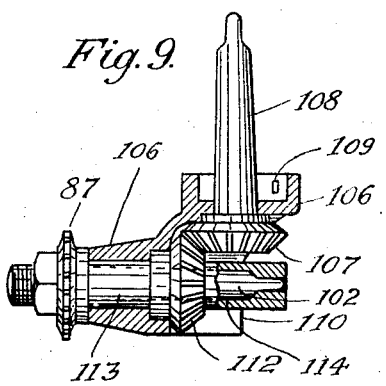
Witnesses:
Theo. Lagaard.
A. E. Hagen.
Inventor:
Herman G. Haase.
By F. A. Whiteley
his Attorney.

UNITED STATES PATENT OFFICE.

HERMAN G. HAASE, OF MINNEAPOLIS, MINNESOTA.

MILLING ATTACHMENT FOR METAL-LATHES.

1,038,571.  Specification of Letters Patent.  Patented Sept. 17, 1912.

Application filed October 7, 1911. Serial No. 653,422.

*To all whom it may concern:*

Be it known that I, HERMAN G. HAASE, a citizen of the United States, residing at Minneapolis, in the county of Hennepin and State of Minnesota, have invented certain new and useful Improvements in Milling Attachments for Metal-Lathes, of which the following is a specification.

My invention relates to a milling attachment for metal lathes and has for its object the construction and application of a device which may be attached to the ordinary standard lathe structure and thereby convert said lathe into a machine for cutting gears, milling out key ways and slots, or doing any form of flat milling.

A primary object of my invention is to provide an attachment of the above description in combination with the lathe mechanism, for cutting gears, and to that end I apply to the lathe spindle a detachable indexing mechanism for rotating the lathe spindle and governing such rotation to properly index the gear to be cut.

My attachment is applied to the standard engine lathe without any alterations or rearrangement of the parts of said lathe, and does not in any respect interfere with the common functions of the lathe. At the same time all of the feeding and controlling devices of the lathe are available in connection with my attachment for effecting the aforesaid milling operations. At a comparatively small cost, therefore, by the use of my attachment an engine lathe may be fitted for doing the work of a gear cutting and milling machine of the full size of the lathe, thus combining in one machine the attributes and functions of two.

In the drawings, illustrating the application of my invention in one form,—Figure 1 is a front side elevation of a portion of a lathe with my attachment applied thereto. Fig. 2 is a section through the adjustable beveled gear drive for my attachment. Fig. 3 is a top plan view showing the manner of attaching the indexing device to the lathe spindle. Fig. 4 is a section taken on line 4—4 of Fig. 3. Fig. 5 is a detail showing the split nut for effecting attachment of the indexing device to the hollow lathe spindle. Fig. 6 is a detail view of the shaft bearings for my attachment. Fig. 7 is a sectional elevation through the center of the upright standard of the cutter holder. Fig. 8 is a plan of said upright standard and the parts mounted therein. Fig. 9 is a plan view of a modification for operating the cutter in a vertical plane.

The lathe frame 10 is supported upon legs 11 and provided with a main driving spindle 12, having thereon a cone pulley 13 for connection with a source of power not shown. The shaft 12 is hollow, as clearly indicated in Figs. 3 and 4, and the cone pulley 13 is mounted on a sleeve 14 and provided with the usual means for connecting the same to rotate shaft 12, or not, as desired. The hollow shaft 12 is the spindle of the lathe, being provided with a head stock center 15 and a face plate disk 16, a similarly positioned clamping mandrel point 17 on a tail stock 18 on the frame of the lathe providing the means for centering and clamping the work to be operated upon. A brace or work-holder 19 adapted to extend from face plate 16 and be clamped to the work by means of set bolt 20 provides means for rotating the work with the spindle 12. Mounted upon the lathe bed 21 is the usual compound tool holder 22, which is adapted to be fed positively by means of screw 23 having connection through gearing 24 with the driving mechanism and being provided with common means, not shown, for connecting or disconnecting the same to the drive at will. The tool rest 22 is also adapted to be driven by means of a shaft 24', connected by means of boxed gearing 25 with a driving shaft 26 having thereon a cone pulley 27 for connection with a driven member of the machine. The shaft 24 is adapted to operate through friction gearing and feed mechanism, not shown, engaging rack 28 on the side of the lathe bed 21 to provide a belt driven feed for the tool carriage 22. The tool holder proper comprises a main bed 29 transversely movable on tool bed 22 by means of hand screw 30 a secondary bed 31, which is adapted to be rotated on bed 29, and a third bed 32 slidable on bed 31 through the operation of hand screw 33. For turning spindle 12 so as to position heavy work independently of the correlated drive and feed of the lathe, a shaft 34 is provided having cased gear connection 35, by means of which it may be connected to rotate with cone pulley 13, said shaft 34 having thereon a gear 36 which may be put into mesh with a gear 37 on spindle 12. All of the above described parts are or may be well known structural features of the standard engine lathe, and, taken by themselves, form no part of my invention. I will now describe my attachment by which the feeding and work holding mechanism of the lathe is adapted to operate in connection with milling and gear cutting mechanism.

A pair of supporting members 38 and 39 are provided with yoke heads 40 for embracing shaft 34. Members 38 and 39 may be bent, as shown, to provide greater spread for the outer ends and are threaded at such outer ends. Turn nuts 41 are threaded on to the aforesaid threaded ends of members 38 and 39 and upon each of these turn nuts rests a bearing member 42 centrally apertured to receive the threaded ends 43 of rods or arms 38 and 39 and provided with bearings 44 at one side of said central apertures for the reception of a cross rod 45, which is secured by means of set bolts 46 to said bearing blocks 42. By this arrangement the arms 38 and 39 are adapted to be adjustably positioned on shaft 34 and the bearing blocks 42 on said arms are capable of adjustable positioning vertically by means of hand nuts 41, but are held spaced in parallel relation by means of the cross rod 45. A brace 47 may be secured to a horizontally disposed portion 48 of rod 39, said brace being bolted at 49 to the cap piece 50 over the inner bearing for spindle 12, by which means the frame formed of rods 38, 39 and 45 will be held in the desired angular position relative to shaft 34. If desired, a collar 51 may be secured to shaft 34 to restrain yoke head 40 on support 38 from possible longitudinal movement on shaft 34. Each of bearing blocks 42 is provided with horizontally disposed bearings 52 for the reception of a shaft 53, said shaft being held from longitudinal movement in said bearings by means of collars 54 and 55 fast on said shaft. Shaft 53 has thereon a pulley 56, by means of which said shaft is driven through belt 57 extending to one of the members of cone pulley 13. At the inner end of shaft 53 is a bevel gear 58 meshing with a bevel gear 59 of peculiar construction, as shown in detail in Fig. 2. The bevel gear 58 is provided with an inwardly extending sleeve 60 rotating within a bearing 61 formed in a tubular portion 62 connecting a gear-holder 63 with the bearing block 42 on support 38. Gear-holder 63 comprises another tubular bearing member 64 similar to and disposed at a suitable angle with bearing 61. A sleeve 65 on bevel gear 59 is rotatably secured within bearing 64 by means of a cap collar 66 threaded into said bearing, as hereinafter described. By this means bevel gears 58 and 59 are held in fixed meshing engagement, although freely rotatable. The bevel gear 59 is formed with an interior cavity 67 having the inner walls thereof rounded as shown at 68 and the outer walls beveled as shown at 69, the interior walls of this cavity being spherically formed as indicated at 70. Part of said cavity, as clearly shown, is formed in the cap piece 66, which is provided with a sleeve member 71 for threading into the interior of sleeve member 65 to permit assembling of the parts. Within the spherical portion 70 of cavity 67 is journaled a ball 72 having therein an aperture of square cross section within which a square shaft 73 is adapted to slide. The ball 72 is provided with a circumferential groove 74 which is engaged by curved lugs 75 seating in groove 74, each of said lugs being provided with a cylindrical stem 76 adapted to engage in bearings formed in the interior portion of sleeve 65 and cap 66. If desired, screws 76' may additionally secure bearing members 76 to sleeve 65, although such screws are not necessary since when cap 69 is secured in position with the inwardly extended portion 71 thereof threaded into sleeve 65, members 76 will be held in swiveling position without any additional fastening means. This structure connects square shaft 73 with beveled gear 59 so that said shaft will rotate with said gear but be free to oscillate therein in any direction by reason of the universal joint connection provided by ball 72 and lugs 75.

I provide a cutter holder 77 of the form shown in Fig. 1, having side standards 78—79, a base plate 80 and a central upright tubular standard 81, the same being adapted to be secured to upper bed 32 of the lathe tool holder by means of a bolt 82, the connection being effected through the usual means provided on the tool holder for securing lathe tools thereto. Tubular standard 81 comprises a central vertical bearing for a shaft 83, as hereinafter described, the upper end or head 84 of shaft 83 being connected by means of universal joint 86 with shaft 73. Upon the lower end of shaft 83 is secured in the usual way a gear cutter or milling tool 87 of any form required for the work in hand. The holder or stand 77 is shown in detail in Fig. 7, in which the spindle or shaft 83 is shown as upwardly tapering and provided with a flanged lip 90, the upward portion thereof having a pair of nuts 91 securing the same down upon a fiber or other type of washer 85, the tapering form of the spindle permitting the same to be taken up to compensate for any wear, so that the bearings may at all times fit tightly. The spindle 83 is surrounded by a bushing of bronze or other suitable material 91 set within a tubular aperture formed eccentrically within a sleeve 92 vertically adjustable in standard 81. The thickened portion of sleeve 92 has formed therein a longitudinal semicircular slot 93 and an annular groove 94 near the upper portion of said slot 92. The standard 81 is provided with a correspondingly formed but interiorly threaded semicircular slot 95, slot 93 being formed with a peripheral diameter equal to the peripheral diameter of slot 95 to the bottoms of the threads cut therein, so that when slots 94 and 95 are placed in juxtaposition, they will form a cylindrical aperture adapted to receive a threaded pin 96. Pin 96 has thereon an annular flange 97 adapted to seat in annular groove 94 in sleeve 92, an elongated semicircular slot 98 being cut in standard 81 and opening from the top thereof to permit the annular flange 97 of pin 96 to move longitudinally when said pin is screwed up or down in threaded slot 95, the upper end of the pin being squared off, as shown at 99, for that purpose.

When the parts are assembled, as shown in Fig. 7, by rotating pin 99, sleeve 92 and the parts carried thereby will be adjusted vertically in the standard 81. A washer 100, similar to washer 85, either or both of which may be of fiber or other material as desired, is placed between lip 90 and the lower end of bushing 91 and sleeve 92. The spindle 83 is provided with a conical cavity 101 for receiving the tapered shank 102 of the cutter tool which is of usual construction. I provide an aperture extending from the upper end of cavity 101 into a transverse keyway 103 in spindle 83 above the top of standard 81 and in this aperture is a bolt 104 having a headed end 105 extending into the said keyway. By using a wedge key the cutter can readily be forced from its seat when it is desired to change the same.

In Fig. 9 is shown a device adapted to be secured to the spindle 83 for transmitting rotary motion to a cutter in a vertical rather than a horizontal plane. This attachment comprises a gear casing 106 adapted to fit over the lower end of sleeve 92. A beveled gear 107 provided with a shank 108, similar in shape to shank 102, is adapted to be forced into rotating union with spindle 83, when gear casing 106 is secured to sleeve 92 by means of a wedge key engaging a wedge shaped keyway 109 extending through the walls of gear casing 106 and sleeve 92, in a well known manner. A pair of lugs 110 are provided to abut against the faces of standards 78 and 79, thus holding the attachment rigidly positioned when in place, it being noted that said standards 78 and 79 are cut away, as indicated in dotted lines at 111. A beveled gear 112 on a shaft 113 journaled in gear holder 106 meshes with beveled gear 107, shaft 113 being provided with a tapering cavity 114 for receiving the shank 102 of a holder for the cutter 87. It will be seen, therefore, that to change from a cutter operating in a horizontal plane to one operating in a vertical plane, it will be necessary only to drive out the vertically positioned cutter shank and replace the attachment shown in Fig. 9. The outer end of shaft 53 is provided with a cone pulley 88 so that by means of belt 89 connection may be made through cone pulley 27 with feed driving shaft 26 to correlate operation of the milling cutter of my attachment with the feeding mechanism of the lathe.

To adapt my attachment to the cutting of gears it is necessary to arrange in connection with the lathe spindle 12 an indexing device. As already indicated the spindle 12 is made hollow. A worm wheel 114 is provided with a tubular sleeve 115 having an aperture 116 extending centrally through the body of the wheel and the sleeve, said sleeve being journaled in a member 117 provided with an arm 118 extending at right angles to member 117 or parallel with aperture 116. A pin 119 having an expanded head 120 at one end and being threaded at the other end is splined to worm wheel 114 and sleeve 115. Surrounding the pin 119, adjacent the expanded head thereof, is a split sleeve 121, as clearly shown in Fig. 5, which is normally of a size adapted to be inserted within the opening of hollow spindle 12. The arm 118 is positioned relatively to pin 119 so that when the same, together with sleeve 121, is inserted within spindle 12, arm 119 will lie upon the top of cap 122 closing the bearing for spindle 12. To secure this arm rigidly to the cap I bolt thereto a pair of lugs 123 and 124, spaced apart to receive arm 118 between the same, and secure the arm fixedly in position by means of a set bolt 125, after which, by means of a nut 126 on the threaded end of pin 119, said pin is drawn outwardly within split sleeve 121 with the result that said sleeve is expanded to cause the same to firmly grip the interior of spindle 12 so that said spindle will be clamped to rotate with worm wheel 114. Member 117 is provided with an offset bracket portion 127 to which is clamped an index disk 128 in which is journaled a shaft 129 provided with an arm 130 for operating worm wheel 114, said shaft 129 also having a crank handle 131 and an adjustable index finger 132 thereon, the indexing mechanism itself being a structure of common use. By these means I secure this indexing mechanism so that the same coöperates with the spindle of the lathe adapting said lathe in combination with my milling attachment to be used as a gear cutting machine.

The operation of my device has been largely given in connection with the detailed description thereof. By means of the hand nuts 41 the position of shaft 53 and the driving pulley 56 thereon may be adjusted to tighten the belt for effective driving action. In the form of attachment shown in Fig. 1, supposing the same is being used to cut teeth in the gear 133, when the power is applied to the lathe, and shaft 26 is geared to shaft 23 to feed carriage 22, the cutter 87 will by means of the mechanism described be rapidly rotated and at the same time be fed with the carriage 22 past the gear blank 133, cutting a slot therein, the universal joint connection of shaft 73 with gear 59 and the sliding connection of said shaft with said universal connection permitting traversing movement of said cutter mechanism while the same is being rotated. When the gear slot is completed, the machine feed is thrown off, the carriage returned to initial position by well known hand operative mechanism thereon, and by means of the indexing mechanism hereinbefore described, spindle 12 will be turned sufficiently to position the gear blank for cutting the next gear slot, which operations will be repeated until the gear is completely cut. For cutting bevel gears the blank may be held on the spindle by means of a chuck or otherwise, and the compound rest turned in a well known manner to present movement of the cutter thereon in a line parallel with the face elements of the beveled blank and upper bed 32 be fed by hand operative worm 33 to cut the bevel gear slots, the indexing for the bevel gear being performed the same as for separate gears. In milling keyways, slots or any form of flat milling, the work will be held between points 15 and 17 and the carriage 22 fed along to effect progressive milling action by the lathe feeding mechanism correlated with the driving mechanism for the milling cutter as hereinbefore described.

The use of the attachment for milling in a vertical plane, whereby spiral cutting, rack cutting, etc., may be accomplished, will be obvious. It will be apparent, therefore, that with my attachment the ordinary lathe can be made to perform all of the operations of the most complicated modern milling machines in addition to its usual functions as a lathe.

I claim:

1. In combination with the spindle and tool carriage of a metal lathe, a milling device removably mounted directly upon said carriage and including a vertical shaft adapted to receive a milling tool of usual construction, a drive rod having universal joint connection with said shaft, and means operated directly from the lathe for driving said rod with which the same is slidably connected.

2. In combination with the spindle and tool carriage of a metal lathe, a milling device removably mounted directly upon said carriage and including a vertical shaft adapted to receive a milling tool of usual construction, a shaft mounted above the lathe spindle and driven therefrom, a bevel gear mounted at a fixed angle to and driven by the shaft, and a driving shaft slidably mounted in said bevel gear and having universal-joint rotative connection therewith and with the vertical shaft.

3. In combination with the spindle and tool carriage of a metal lathe, a milling device removably mounted directly upon said carriage including a vertical shaft, a frame removably secured to the lathe frame and extending outwardly above the spindle, a shaft journaled in said frame parallel with and driven from the cone pulley of the lathe spindle, a bevel gear on one end of said shaft, a gear casing rigid on said frame and provided with a bearing for said shaft, a bevel gear held in mesh with said first gear and at a fixed angle with the shaft by said gear casing, and a driving shaft slidably mounted in said last named bevel gear and having universal-joint rotative connection therewith and with the vertical shaft.

4. In combination with the spindle and tool carriage of a metal lathe, a milling device removably mounted directly upon said carriage including a vertical shaft, a frame removably secured to the lathe frame and extending outwardly above the spindle, a shaft journaled in said frame parallel with and driven from the cone pulley of the lathe spindle, means for driving the tool carriage feed from said shaft, and extensible means having universal joint connection with the vertical shaft and with the horizontal shaft for operating the former from the latter.

5. In combination with the spindle and tool carriage of a metal lathe, a milling device removably mounted directly upon said carriage including a vertical shaft, a frame removably secured to the lathe frame and extending outwardly above the spindle, a shaft journaled in said frame parallel with and driven from the cone pulley of the lathe spindle, a bevel gear on one end of said shaft, a gear casing rigid on said frame and provided with a bearing for said shaft, a bevel gear held in mesh with said first gear and at a fixed angle with the shaft by said gear casing, a member mounted for universal movement in said last gear provided with an angular opening, and a driving shaft constructed and arranged to slide in said opening, and having universal-joint connection with the vertical shaft.

6. In combination with the spindle and tool carriage of a metal lathe, a milling device mounted on said carriage in position to operate on work held by said spindle, said milling device including a vertical shaft, a horizontal shaft having driving connection with the lathe, and means including a flexible connection direct to said vertical shaft for driving the vertical shaft from the horizontal shaft.

7. In combination with the spindle and tool carriage of a metal lathe, a milling device mounted on said carriage in position to operate on work held by said spindle, said milling device including a vertical shaft, a horizontal shaft having driving connection with the lathe, a bevel gear driven by the horizontal shaft, a member in the bevel gear mounted for universal movement, and a shaft connected by universal joint with said vertical shaft and having sliding connection with said member in the gear, whereby rotary movement of the gear will be transmitted to the connecting shaft and to the vertical shaft when the milling device is in different positions on the lathe bed.

8. In combination with the spindle and tool carriage of a metal lathe, a milling device mounted on said carriage in position to operate on work held by said spindle, said milling device including a vertical shaft, a horizontal shaft having driving connection with the lathe, means driven from the horizontal shaft for feeding said carriage along the lathe bed, and extensible means connecting said vertical shaft operatively with said horizontal shaft for rotating the said vertical shaft while the carriage is being fed.

9. In combination with the spindle and tool carriage of a metal lathe, a milling device mounted on said carriage in position to operate on work held by said spindle, said milling device including a vertical shaft, a horizontal shaft having driving connection with the lathe, means driven from the horizontal shaft for feeding said carriage along the lathe bed, a bevel gear driven by the horizontal shaft, a member in the bevel gear mounted for universal movement, and a shaft connected by universal joint with said vertical shaft and having sliding connection with said member in the gear, whereby rotary movement of the gear will be transmitted to the connecting shaft and to the vertical shaft while the carriage is being fed.

10. In combination with the spindle and tool carriage of a metal lathe, a milling device mounted on said carriage in position to operate on work held by said spindle, said device comprising a frame adapted to be removably secured to said carriage, a vertical sleeve in said frame, means for adjusting said sleeve vertically, a vertical shaft rotatably mounted in said sleeve, and means having operative connection with the lathe for rotating said vertical shaft.

11. In combination with the spindle and tool carriage of a metal lathe, a milling device removably mounted directly upon said carriage and including a vertical shaft adapted to receive a milling tool of usual construction, a drive rod having universal-joint connection with said shaft, means operated directly from the lathe for driving said rod with which the same is slidably connected, and means for adjusting said vertical shaft longitudinally properly to position the milling tool.

12. In combination with the spindle and tool carriage of a metal lathe, a frame member for a milling device adapted to be removably secured upon said carriage, a sleeve vertically mounted in said frame member, said sleeve being provided with a vertical bearing eccentrically positioned therein and with a semicircular groove extending along the outside of the thicker portion of said sleeve, a similar threaded groove being provided in the frame member, a threaded adjusting pin registering in both said grooves and having a collar entering a depression formed in said sleeve, said frame member being cut away to provide clearance for said collar, a tool-holding shaft rotatably mounted in said bearing and means having operative connection with the lathe for rotating said shaft.

13. In combination with the spindle and tool carriage of a metal lathe, a milling device mounted on said carriage in position to operate on work held by said spindle, means for feeding the carriage, means for driving the milling device from the lathe while the carriage is being fed, and an indexing device comprising a frame, a worm wheel mounted thereon, a pin extending centrally through said worm wheel having an expanded head, a split sleeve surrounding said pin adapted to be inserted within said spindle, and means for extending the expanded head within the sleeve to cause the sleeve to grip the spindle, whereby the indexing device may operate to rotate the spindle to properly position a gear blank.

In testimony whereof I affix my signature in presence of two witnesses.

HERMAN G. HAASE.

Witnesses:
F. A. WHITELEY,
H. A. BOWMAN.